(12) United States Patent
Shrimal et al.

(10) Patent No.: US 12,724,611 B2
(45) Date of Patent: Sep. 1, 2026

(54) ADAPTIVE CACHE MEMORY BUFFER REGISTER ARCHITECTURE

(71) Applicant: QUALCOMM Incorporated, San Diego, CA (US)

(72) Inventors: Saurabh Kumar Shrimal, Noida (IN); Sandeep Dager, Ghaziabad (IN); Ravindra Kumar, Bengaluru (IN); Hongjiang Shang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 18/895,986

(22) Filed: Sep. 25, 2024

(65) Prior Publication Data

US 2026/0086810 A1 Mar. 26, 2026

(51) Int. Cl.
*G06F 9/32* (2018.01)
*G06F 9/30* (2018.01)

(52) U.S. Cl.
CPC .......... *G06F 9/321* (2013.01); *G06F 9/30021* (2013.01); *G06F 9/30047* (2013.01)

(58) Field of Classification Search
CPC ... G06F 9/321; G06F 9/30021; G06F 9/30047
See application file for complete search history.

(56) References Cited

U.S. PATENT DOCUMENTS

| | | | | |
|---|---|---|---|---|
| 9,026,738 | B2 * | 5/2015 | Kato | G06F 12/0895 711/137 |
| 11,200,170 | B2 * | 12/2021 | Kimelman | G06F 12/0862 |

* cited by examiner

*Primary Examiner* — Khai M Nguyen
(74) *Attorney, Agent, or Firm* — Loza & Loza LLP

(57) ABSTRACT

Aspects of the disclosure are directed to an adaptive cache memory buffer register reassignment. In accordance with one aspect, the disclosure includes incrementing a write hit-miss state based on a write address validation state and a write data validation state; incrementing a read hit-miss state based on a read address validation state and a read data validation state; computing a net mode count based on the write hit-miss state and the read hit-miss state; comparing the net mode count to a mode threshold value to update a plurality of mode toggle states; and generating an adaptive cache memory buffer register reassignment based on the plurality of mode toggle states.

20 Claims, 17 Drawing Sheets

To B

Write

Write b5

101 c3 c5 c1 c0 c2 13e 1* 13b 1* 13* 1* 13* 1* 13* 1* 13* 1* 132 1* 12f 13* 1* 1* 12* 1* c5 c4 c3 c2 c1 c0 13* 13e 13* 13b 1* 13* 1* 13* 1* 13* 1* 13* 132 1* 12f 1* 12* 1* ed84_99dd_8b0f_2cc6_95c4_39a8_853e_of5c

9325_30b4_9da5_b66a_c555_4a79_42ae_0103

9325_30b4_9da5_b66a_c555_4a79_42ae_0103 from A

FIG. 10 cont

ADAPTIVE CACHE MEMORY BUFFER REGISTER ARCHITECTURE

TECHNICAL FIELD

This disclosure relates generally to the field of information processing, and, in particular, to an adaptive cache memory buffer register architecture.

BACKGROUND

In information processing, a hierarchy of memory devices is used by a processor for data and instruction storage. The hierarchy of memory devices includes a main memory and a cache memory. The cache memory is a memory device with a faster read/write memory access but a smaller memory capacity than main memory. In one example, the cache memory is accessed by the processor if a current instruction uses data which is currently stored in the cache memory. Cache memory access may improve overall processor performance in terms of dc power efficiency. A figure of merit improvement in a cache memory buffer register architecture with respect to power performance is desirable.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides adaptive cache memory buffer register architecture. Accordingly, the present disclosure discloses an apparatus including: a first summer coupled to a second summer, the first summer and the second summer configured to increment a write hit-miss state based on a write address validation state and a write data validation state, and further configured to increment a read hit-miss state based on a read address validation state and a read data validation state; a mode count block coupled to the first summer and the second summer, the mode count block configured to compute a net mode count based on the write hit-miss state and the read hit-miss state; and a threshold comparison module coupled to the mode count block, the threshold comparison module configured to compare the net mode count to a mode threshold value to update a plurality of mode toggle states.

In one example, the threshold comparison module is further configured to generate an adaptive cache memory buffer register reassignment based on the plurality of mode toggle states and an input address. In one example, the apparatus further includes a plurality of comparators coupled to an address register configured to store the input address, the plurality of comparators each configured to compare the input address to either a write address register or a read address register.

In one example, the apparatus further includes a write data and address validation block coupled to the first summer, the write data and address validation block configured to store the write address validation state. In one example, the apparatus further includes a write only address validation block coupled to the second summer, the write only address validation block configured to store the write data validation state.

In one example, the apparatus further includes a read data and address validation block coupled to the first summer, the read data and address validation block configured to store the read address validation state. In one example, the apparatus further includes a read only address validation block coupled to the second summer, the read only address validation block configured to store the read data validation state.

Another aspect of the disclosure provides an apparatus including: means for incrementing a write hit-miss state based on a write address validation state and a write data validation state; means for incrementing a read hit-miss state based on a read address validation state and a read data validation state; means for computing a net mode count based on the write hit-miss state and the read hit-miss state; means for comparing the net mode count to a mode threshold value to update a plurality of mode toggle states; and means for generating an adaptive cache memory buffer register reassignment based on the plurality of mode toggle states.

In one example, the apparatus further includes means for comparing an input address to a plurality of write cache addresses to determine the write address validation state; and means for comparing the input address to a plurality of read cache addresses to determine the read address validation state. In one example, the apparatus further includes means for accepting the input address in a memory mode.

Another aspect of the disclosure provides a method including: incrementing a write hit-miss state based on a write address validation state and a write data validation state; incrementing a read hit-miss state based on a read address validation state and a read data validation state; computing a net mode count based on the write hit-miss state and the read hit-miss state; comparing the net mode count to a mode threshold value to update a plurality of mode toggle states; and generating an adaptive cache memory buffer register reassignment based on the plurality of mode toggle states.

In one example, the method further includes adjusting the net mode count based on a comparison of a read miss state and a write miss state once the net mode count is computed. In one example, the comparison is a difference between the read miss state and the write miss state.

In one example, the method further includes steering the net mode count towards a null value. In one example, the steering is based on a scaled aggregate hit count. In one example, the scaled aggregate hit count is based on a superposition of a write hit state and a read hit state.

In one example, the method further includes comparing an input address to a plurality of write cache addresses to determine the write address validation state. In one example, the method further includes comparing the input address to a plurality of read cache addresses to determine the read address validation state. In one example, the method further includes accepting the input address in a memory mode. In one example, the method further includes initializing the memory mode.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
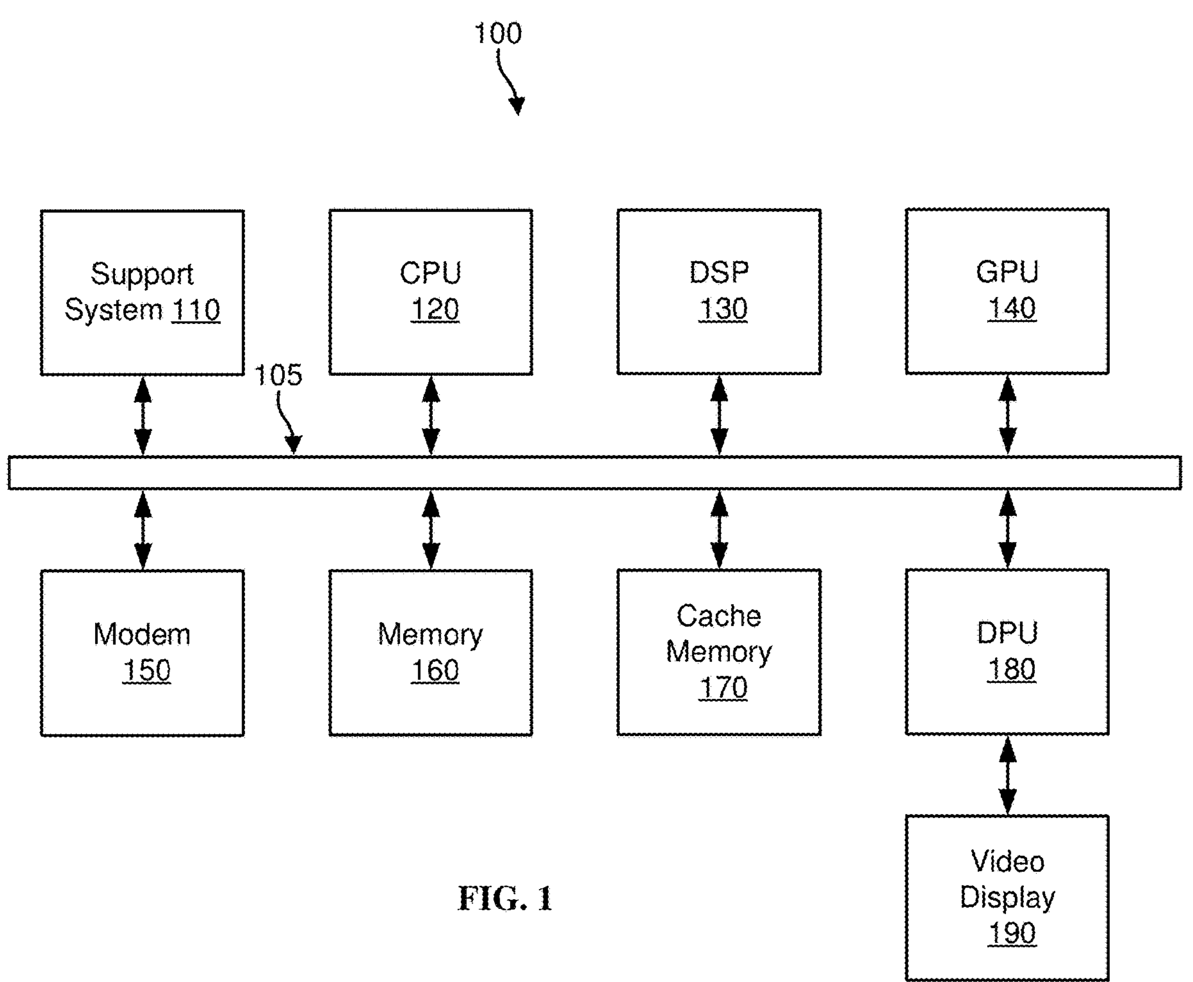
FIG. 1 illustrates an example information processing system.

FIG. 1 illustrates an example information processing system 100. In one example, the example information processing system 100 includes a plurality of processors or processing engines such as a central processing unit (CPU) 120, a digital signal processor (DSP) 130, a graphics processing unit (GPU) 140, a display processing unit (DPU) 180, etc. In one example, various other functions in the information processing system 100 may be included such as a support system 110, a modem 150, a memory 160, a cache memory 170 and a video display 190. For example, the plurality of processing engines and various other functions may be interconnected by an interconnection databus 105 to transport data and control information. For example, the memory 160 and/or the cache memory 170 may be shared among the CPU 120, the GPU 140 and the other processing engines. In one example, the CPU 120 may include a first internal memory which is not shared with the other processing engines. In one example, the GPU 140 may include a second internal memory which is not shared with the other processing engines. In one example, any processing engine of the plurality of processing engines may have an internal memory which is not shared with the other processing engines.

An information processing system, for example, a computing system with multiple slices (e.g., processing engines) or a system on a chip (SoC), may employ the cache memory 170 for rapid read or write memory access. In one example, the cache memory 170 is a shared resource for a plurality of processor clients. For example, processor clients are software applications, processor users, processor peripheral devices, communication devices, remote users, etc. In one example, the cache memory 170 requires cache memory management for efficient utilization of the shared resource.

In one example, the cache memory 170 is organized as a plurality of cache lines where each cache line is a plurality of memory words. In one example, a memory word is a smallest addressable increment of a memory. That is, a memory address is used as an identifier of a memory word which has a fixed size of M bits (e.g., M is an integer). For example, an active memory word is a memory word which stores active data.

In one example, a processing engine may need to access data in a main memory (e.g., memory 160). For example, to reduce access time, the needed data may be stored in the cache memory 170 which has a faster access time and smaller memory capacity. If the processing engine is able to access the needed data from the cache memory 170, then a cache hit occurs. If the processing engine is unable to access the needed data from the cache memory 170, then a cache miss occurs. In one example, an efficient memory architecture results in a high quantity of cache hits (i.e., a high cache hit efficiency) among all attempted memory accesses.

In one example, based on empirical benchmarks and typical processing engine pipeline instructions, data processing through a memory for instructions and data usage follow some unique patterns. In one example, pattern identification to improve cache hit efficiency for memory access with an adaptive cache memory buffer register architecture may improve an architecture figure of merit with respect to power, performance and area. In one example, the architecture figure of merit (FOM) is proportional to cache hit efficiency divided by dc power consumption and chip area. That is, an improved architecture FOM may be attained with a higher cache hit efficiency and a lower dc power consumption (W) and a lower chip area ($mm^2$). In one example, an adaptive cache memory buffer register architecture may double cache hit efficiency for several use cases of multimedia processing engine instruction and data usage with minimal hardware impact in terms of dc power consumption and chip area. In one example, the adaptive cache memory buffer register architecture may ensure optimal switching activity on new digital logic to minimize dc power consumption.

In one example, an adaptive cache memory buffer register architecture may reduce dc power consumption by eliminating redundant memory accesses. In one example, a static cache memory buffer register architecture uses a higher quantity of data registers which leads to a higher dc power consumption and greater chip area which degrades the architecture FOM. In one example, an adaptive cache memory buffer register architecture may nearly double the cache hit efficiency (i.e., performance) with an optimal dc power consumption and chip area product.

Figure 2:
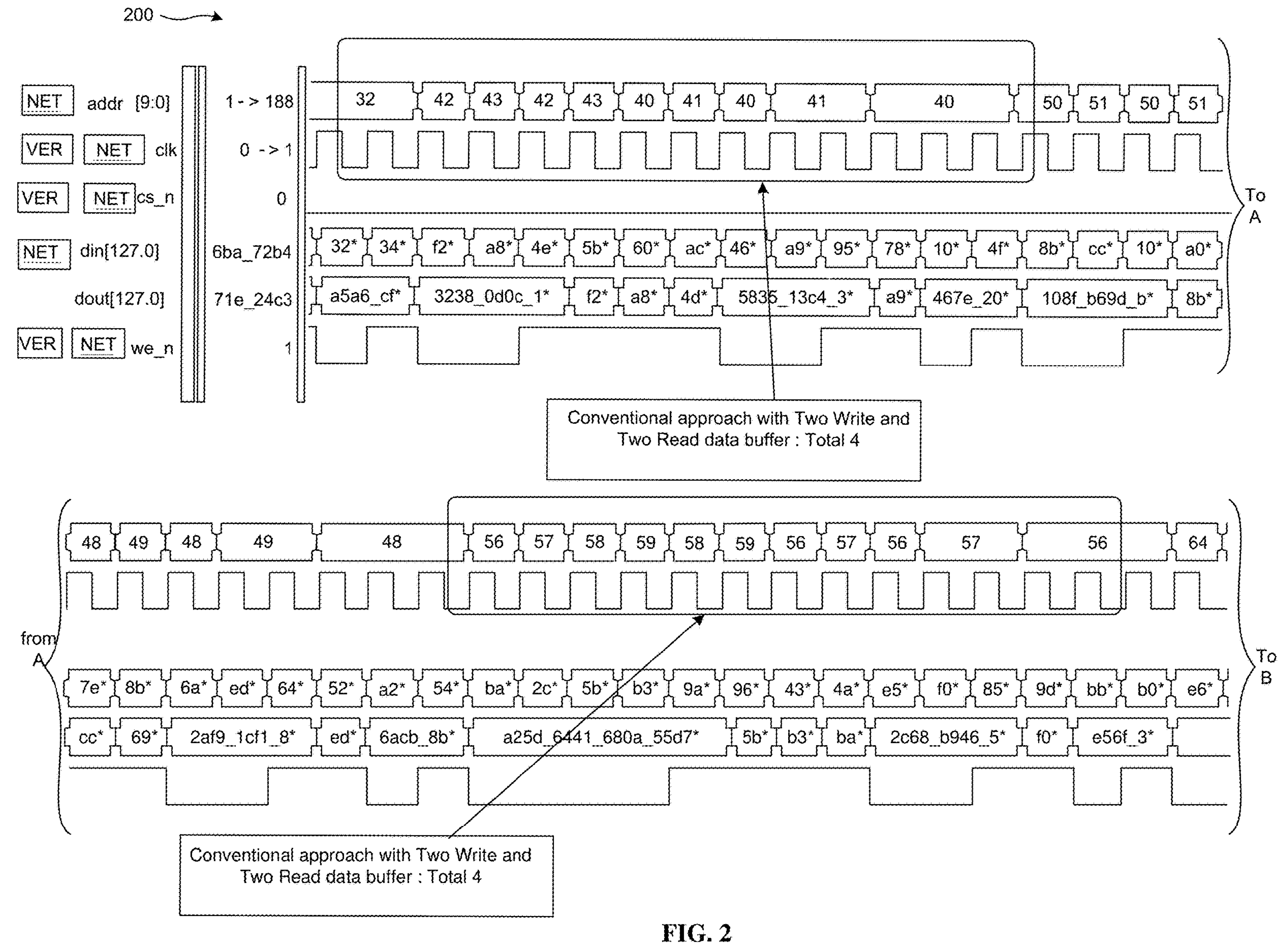
FIG. 2 illustrates an example static architecture benchmark simulation trace graph.
Figure 2:
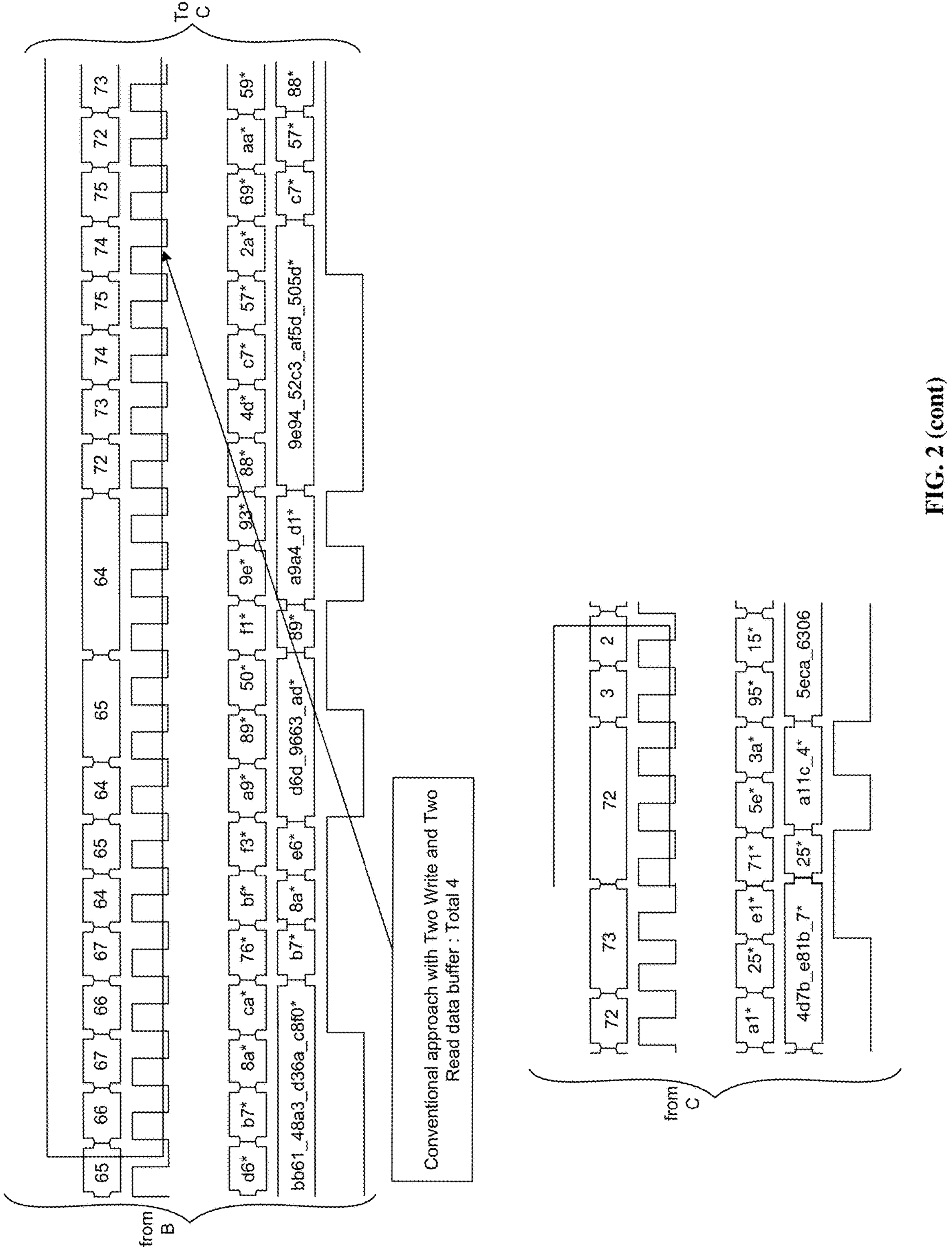

FIG. 2 illustrates an example static architecture benchmark simulation trace graph 200. In one example, the example static architecture uses two write cache data buffers and two read cache data buffers for a total of four cache data buffers. In one example, the static architecture benchmark simulation trace graph 200 shows caching opportunities while performing write and read operations. For example, after memory is written with two addresses, the two addresses are read. For example, FIG. 2 shows address 40 and address 41 being written while in a next cycle, address 41 and address 40 are read. For example, a similar pattern is shown for address 58 and address 59 being written and then read in sequence. In one example, memory access is required four times in these two cases.

Figure 3:
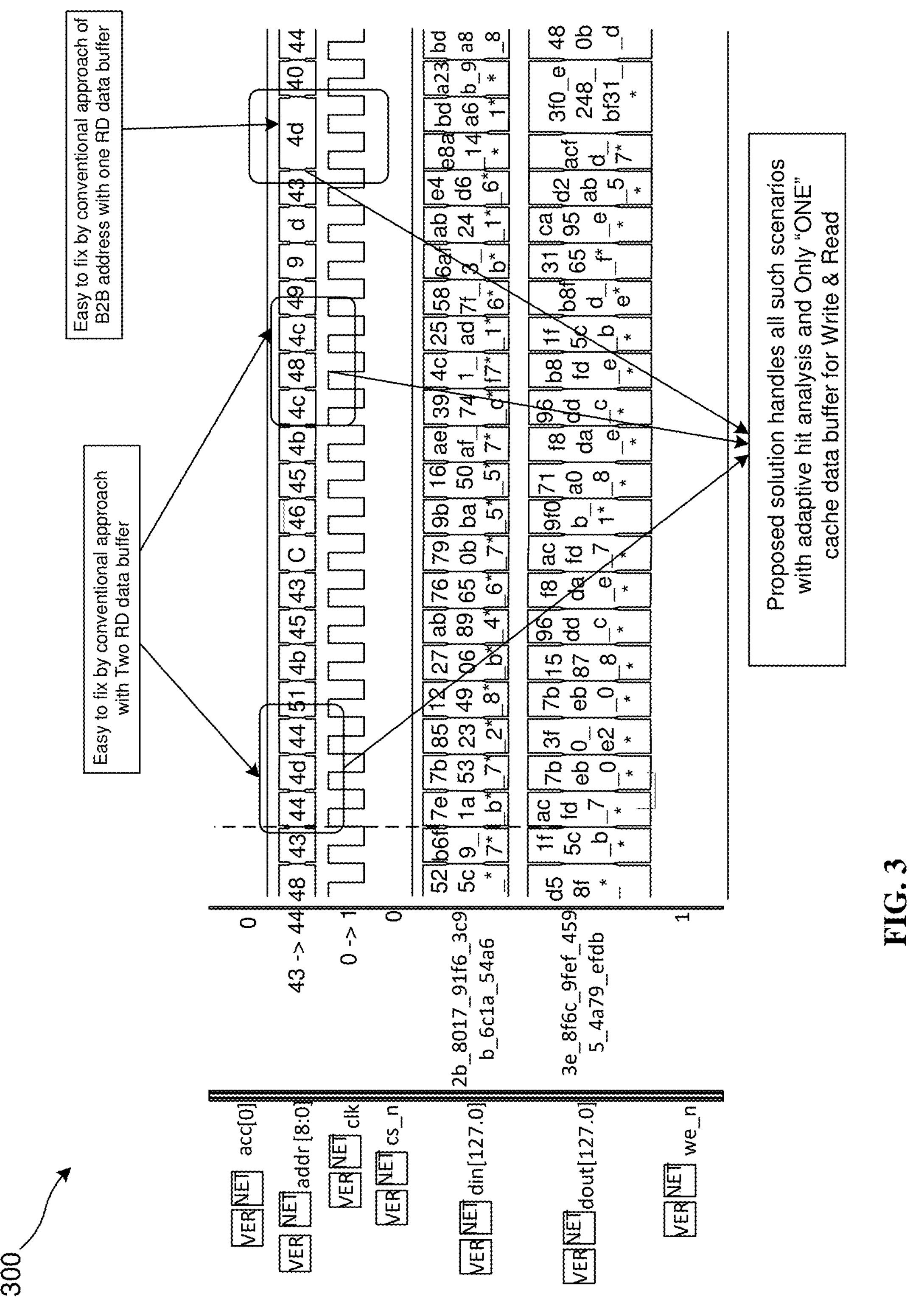
FIG. 3 illustrates an example adaptive architecture benchmark simulation trace graph.

FIG. 3 illustrates an example adaptive architecture benchmark simulation trace graph 300. In one example, the example adaptive architecture uses only two cache data buffers for both write and read functions using an adaptive hit-miss analysis. In one example, the adaptive architecture benchmark simulation trace graph 300 shows read-read opportunities. For example, a memory read for address 44 is read in a next cycle for address 4D and then again for address 44. For example, this behavior shows that if address 44 was being cached in a previous cycle, the same data could be reused. In one example, a similar pattern occurs with address 4C later in the trace graph 300.

In one example, an adaptive cache memory buffer register architecture is adaptive to a memory mode based on cache hit efficiency. In one example, a memory mode may be a write only (WO) mode, a read only (RO) mode, a read/write (RW) mode or a read write tunable (RWT) mode. In one example, the WO mode is a write only (WO) mode. In one example, a cache depth is a measure of a maximum number of cache lines in a cache memory. In one example, a cache line is a plurality of bits in a cache memory data unit (e.g., memory word).

In one example, a static cache memory buffer register architecture with a cache depth of 2 uses four data buffer registers for read and write memory access. In one example, an adaptive cache memory buffer register architecture with a cache depth of 1 uses only two data buffer registers for read and write memory access.

In one example, the adaptive cache memory buffer register architecture modifies a data buffer allocation policy based on a hit-miss analysis. For example, in a WO mode dominating scenario, the adaptive architecture performs equivalently to a static architecture for a cache depth of 2 for RW mode. For example, in a RO mode dominating scenario, the adaptive architecture performs equivalently to a static architecture for a cache depth of 2 for RW mode. In one example, the adaptive architecture handles a doubling of data buffer on a RO mode side and a WO mode side to maximum cache hit efficiency with reduced dc power consumption.

Figure 4:
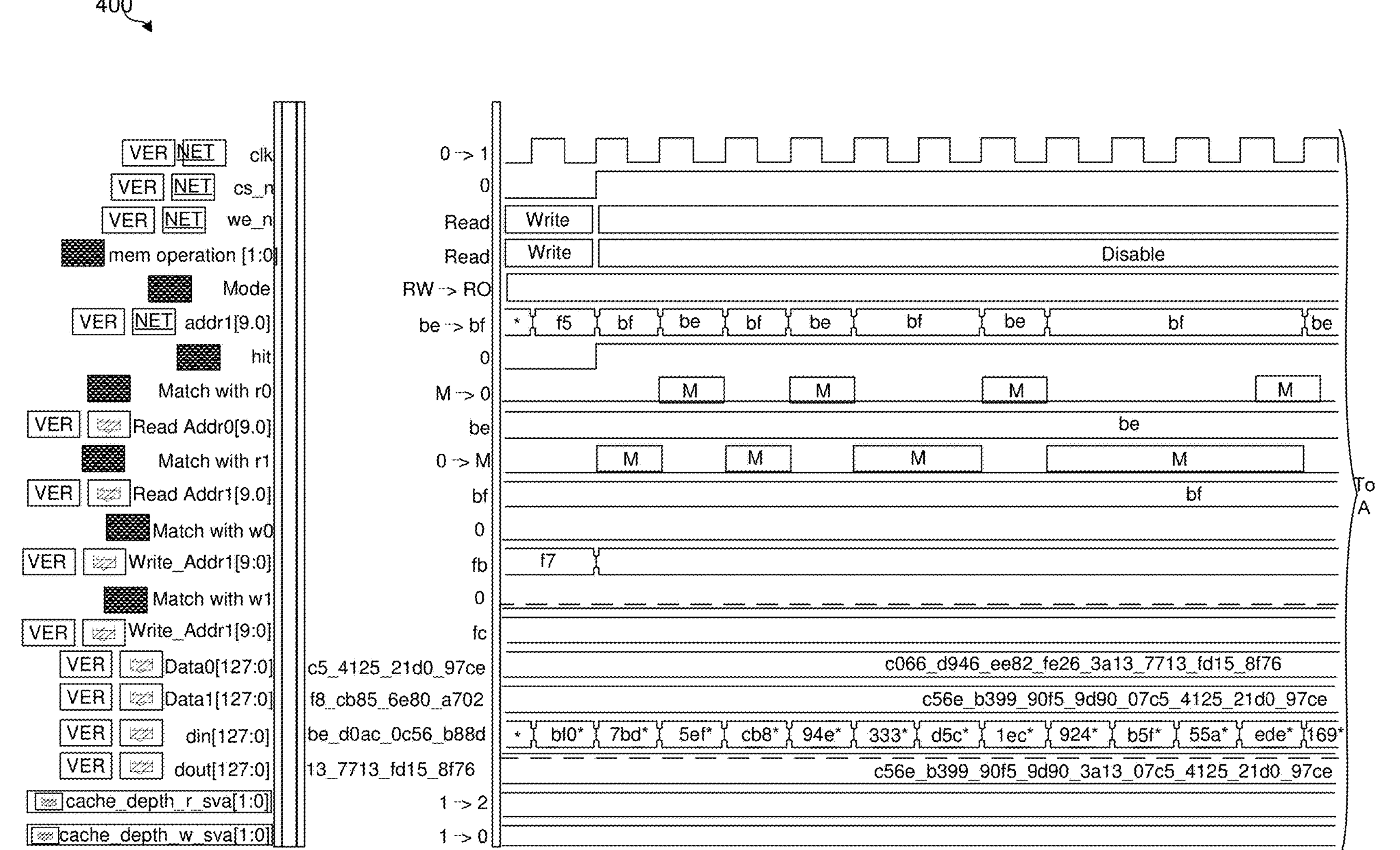
FIG. 4 illustrates an example adaptive architecture simulation trace graph.
Figure 4:
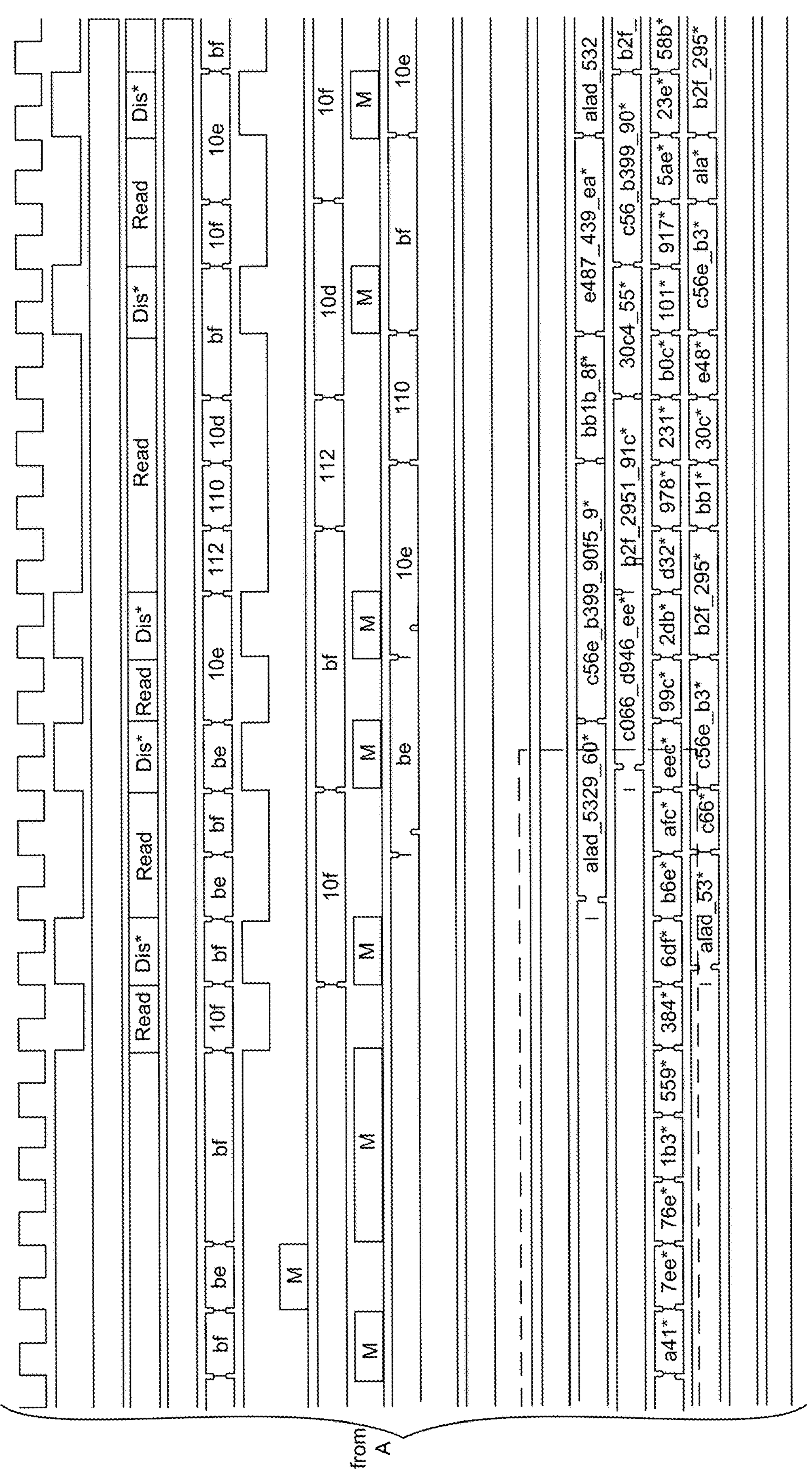

FIG. 4 illustrates an example adaptive architecture simulation trace graph 400. In one example, the adaptive architecture simulation trace graph 400 shows that no data toggle occurs while the read address attains cache hits while the cache memory is disabled. For example, this behavior is in contrast with the example static architecture where significant data switching results in excessive dc power consumption. In one example, the annotation "M" in the waveform indicates a match for a cache hit. For example, the annotation "mem_operation" shows a memory state (i.e., read, write, or disable). In one example the annotation "DataX" indicates data in cache data registers.

Figure 5:
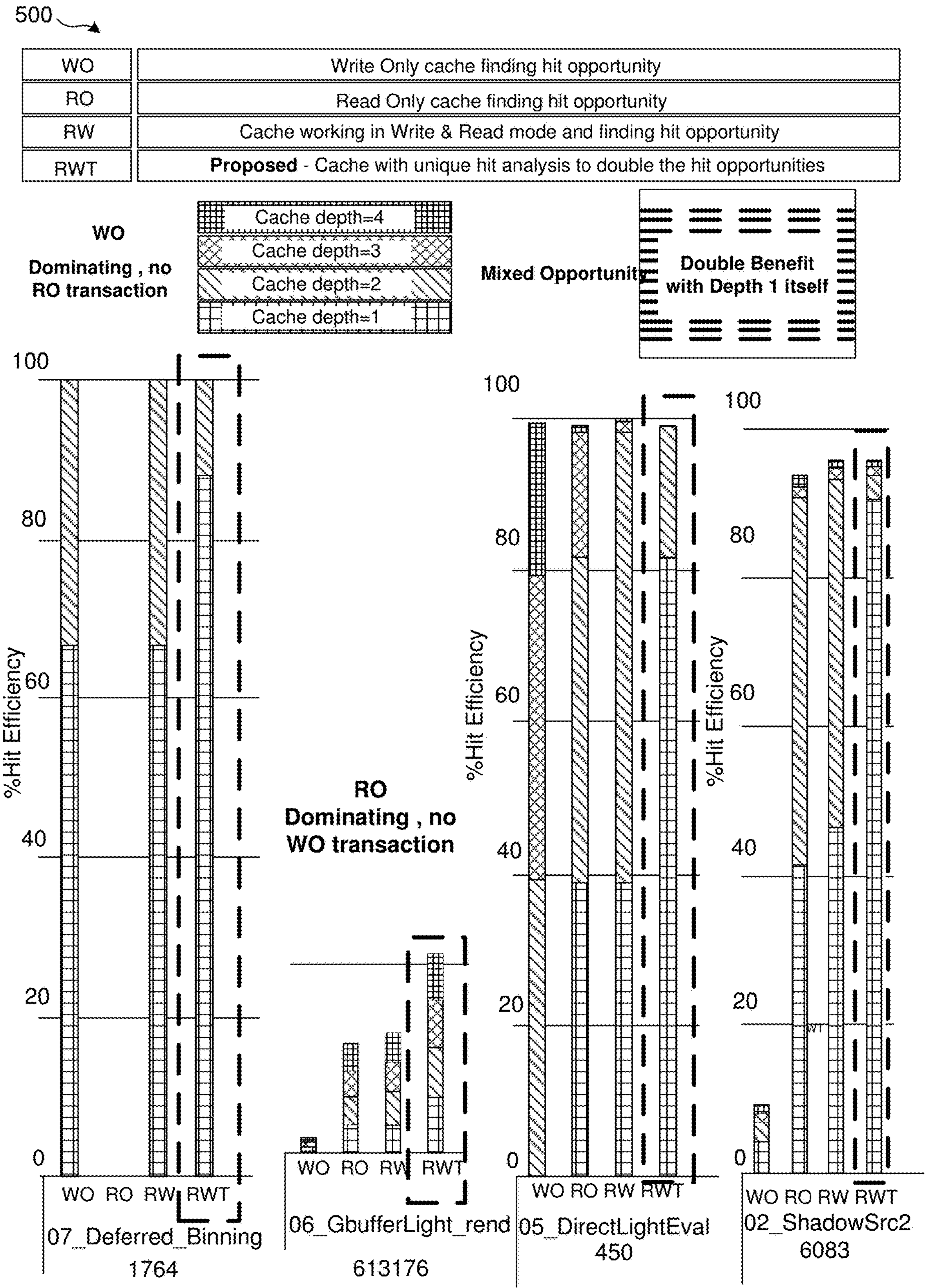
FIG. 5 illustrates an example adaptive architecture simulation performance graph.

FIG. 5 illustrates an example adaptive architecture simulation performance graph 500. In one example, bar graphs illustrate when Write Only (WO) hit opportunities are dominating in the data pattern architecture and both data registers are assigned to a write side of the cache memory. For example, for the first bar graph set there are no Read Only (RO) opportunities, but there are WO opportunities present at the same time. In one example, for the second bar graph set there are fewer WO opportunities than RO hit opportunities. For example, in this scenario the adaptive architecture aligns data registers to the read side which fosters better hit efficiency and reduced dc power consumption.

In one example, if there are both WO and RO opportunities (e.g., the third bar graph set), the adaptive architecture will be dynamically aligned to either the write side or the read side to maximize the probability of cache hits. In one example, the fourth bar graph set shows that even with a single data register, the cache memory may achieve double buffer benefits by dynamically assigning the single data register.

Figure 6:
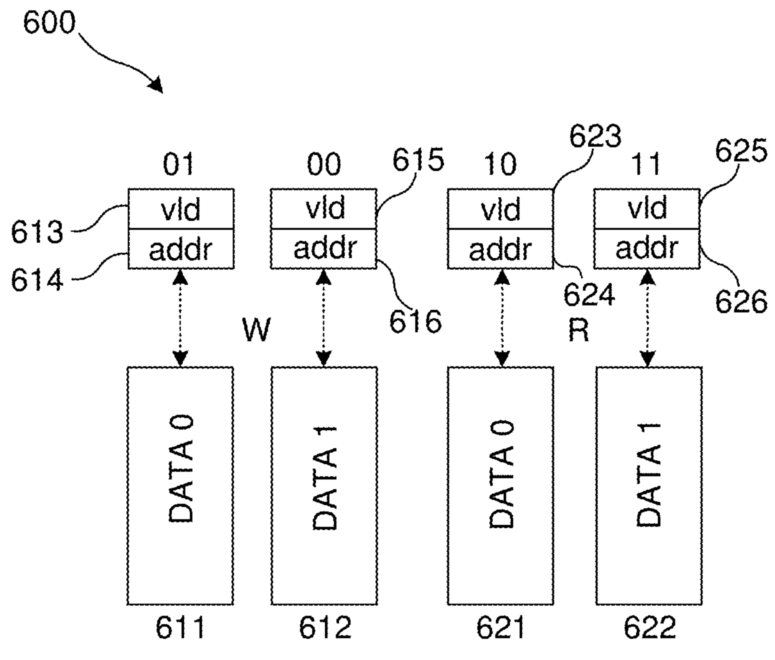
FIG. 6 illustrates an example static cache memory buffer register block diagram.

FIG. 6 illustrates an example static cache memory buffer register block diagram 600. In one example, a first write data register 611 and a second write data register 612 are used for write memory access, and a first read data register 621 and a second read data register 622 are used for read memory access. In one example, the first write data register 611 is coupled to a first write valid register 613 and a first write address register 614. In one example, the second write data register 612 is coupled to a second write valid register 615 and a second write address register 616. In one example, the first read data register 621 is coupled to a first read valid register 623 and a first read address register 624. In one example, the second read data register 622 is coupled to a second read valid register 625 and a second read address register 626.

Figure 7:
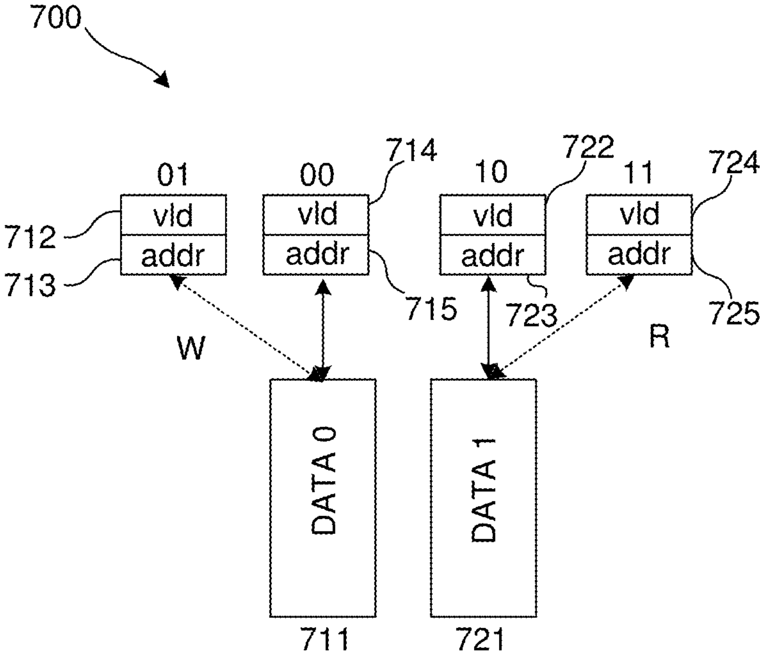
FIG. 7 illustrates an example adaptive cache memory buffer register block diagram.

FIG. 7 illustrates an example adaptive cache memory buffer register block diagram 700. In one example, a write data register 711 is used for write memory access, and a read data register 721 is used for read memory access. In one example, the write data register 711 is coupled to a first write valid register 712, a first write address register 713, a second write valid register 714 and a second write address register 715. In one example, the read data register 721 is coupled to a first read valid register 722, a first read address register 723, a second read valid register 724 and a second read address register 725. In one example, the write data register 711 and the read data register 721 may be reassigned based on a hit-miss analysis.

Figure 8:
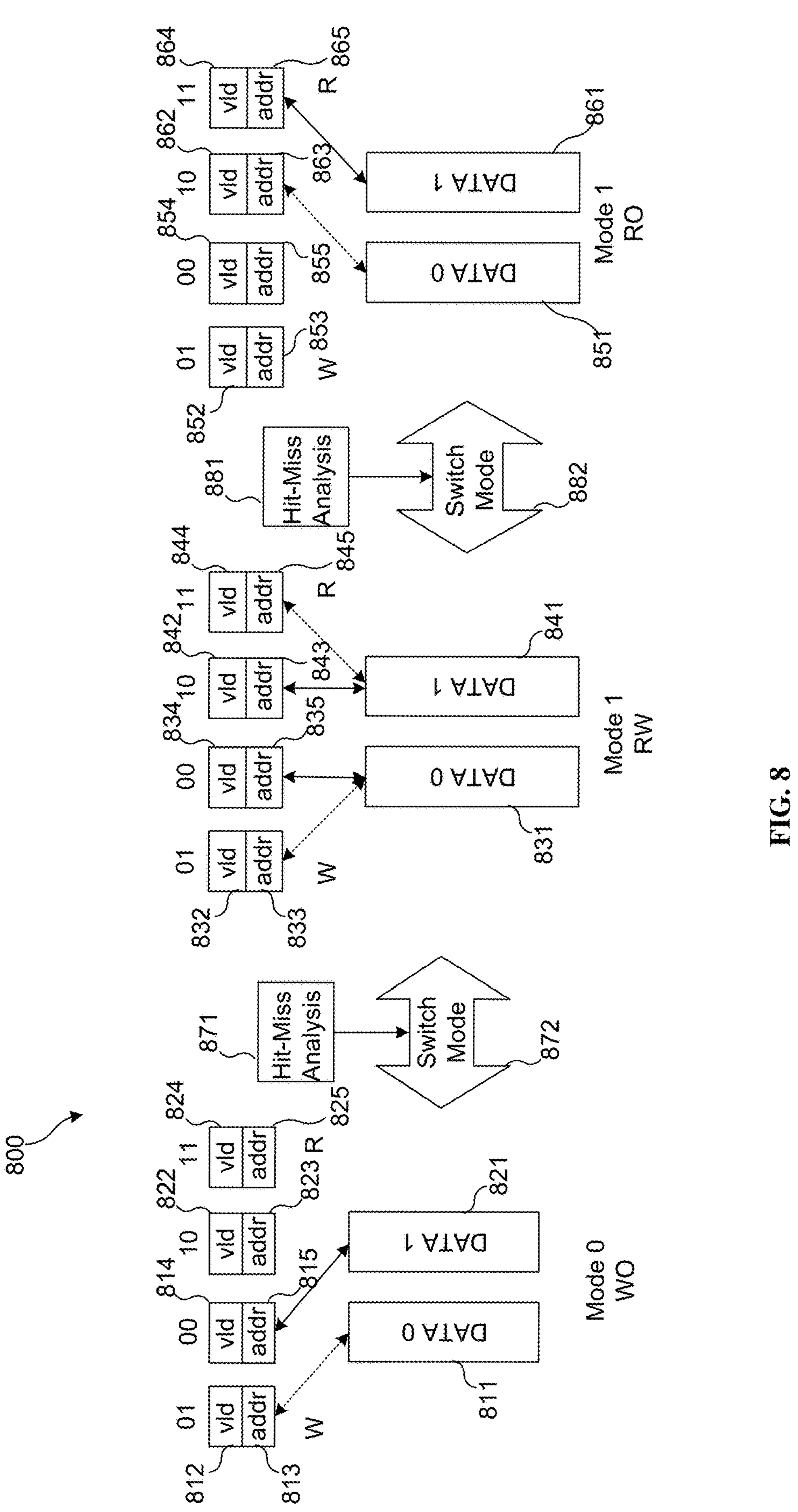
FIG. 8 illustrates an example mode switching in an adaptive cache memory buffer register architecture.

FIG. 8 illustrates an example mode switching in an adaptive cache memory buffer register architecture 800. In one example, for a write only (WO) mode, a first data register 811 is used for write memory access, and a second data register 821 is used for write memory access. In one example, the first data register 811 is coupled to a first write valid register 812 and a first write address register 813. In one example, the second data register 821 is coupled to a second write valid register 814 and a second write address register 815. In one example, a first read valid register 822 and a first read address register 823 are decoupled from any data registers. In one example, a second read valid register 824 and a second read address register 825 are decoupled from any data registers.

In one example, for a read/write (RW) mode, a first data register 831 is used for write memory access, and a second data register 841 is used for read memory access. In one example, the first data register 831 is coupled to a first write valid register 832, a first write address register 833, a second write valid register 834 and a second write address register 835. In one example, the second data register 841 is coupled to a first read valid register 842, a first read address register 843, a second read valid register 844 and a second read address register 845.

In one example, for a read only (RO) mode, a first data register 851 is used for read memory access, and a second data register 861 is used for read memory access. In one example, the first data register 851 is coupled to a first read valid register 862 and a first read address register 863. In one example, the second data register 861 is coupled to a second read valid register 864 and a second read address register 865. In one example, a first write valid register 852 and a first write address register 853 are decoupled from any data registers. In one example, a second write valid register 854 and a second write address register 855 are decoupled from any data registers.

In one example, based on a first hit-miss analysis 871, a first mode switch 872 may transition between the WO mode and the RW mode. In one example, based on a second hit-miss analysis 881, a second mode switch 882 may transition between the RW mode and the RO mode.

In one example, the adaptive cache memory buffer register architecture 800 may switch modes (e.g., RO mode, RW mode, WO mode) based on a hit-miss analysis. In one example, the adaptive cache memory buffer register architecture 800 may use an extra address to analyze a cache miss due to a current mode. In one example, a cache data buffer register will not toggle if a cache miss occurs, although the hit-miss analysis may proceed. In one example, the mode switching makes the adaptive cache memory buffer register architecture 800 more efficient in all scenarios.

Figure 9:
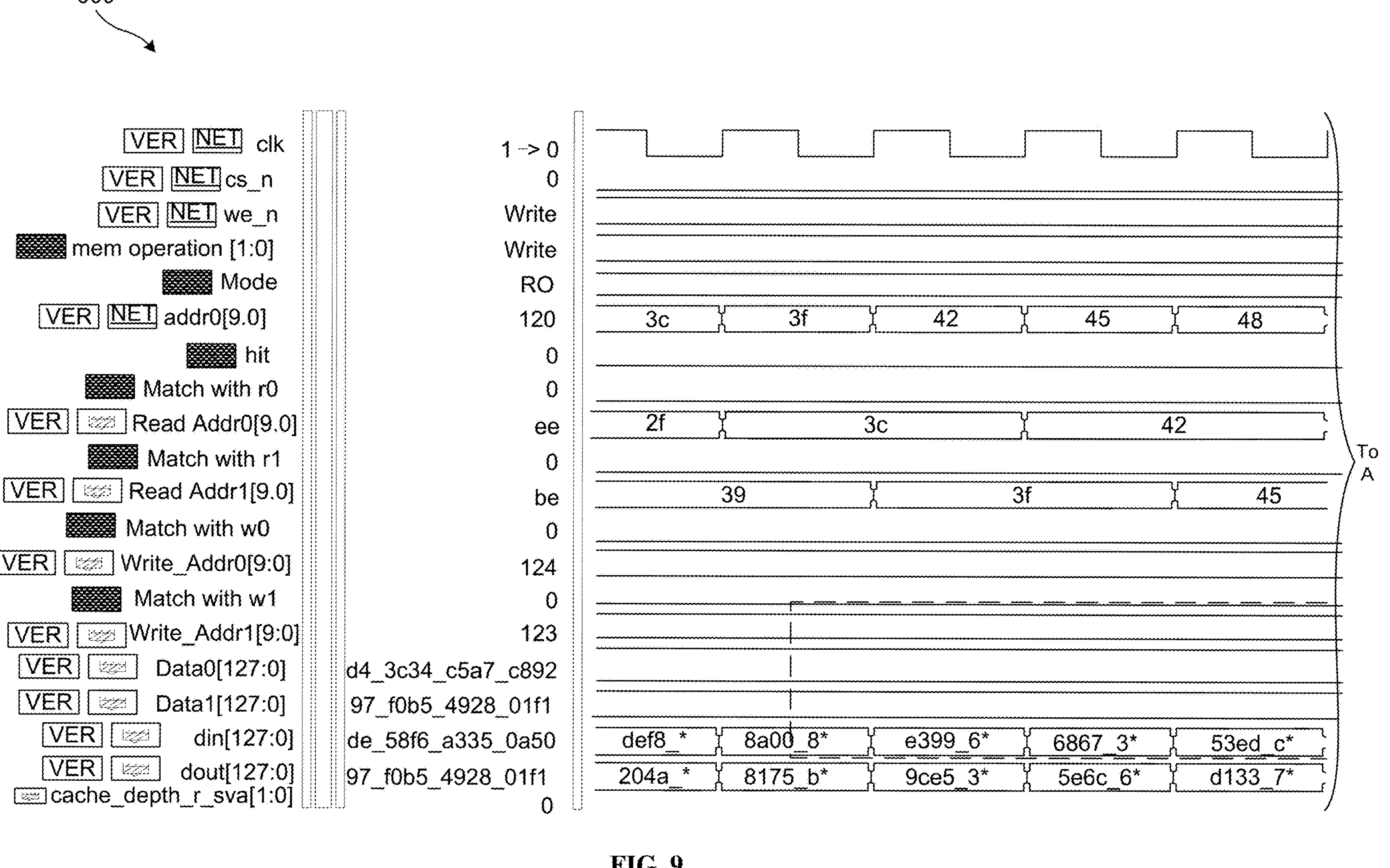
FIG. 9 illustrates an example write only (WO) mode simulation graph.
Figure 9:
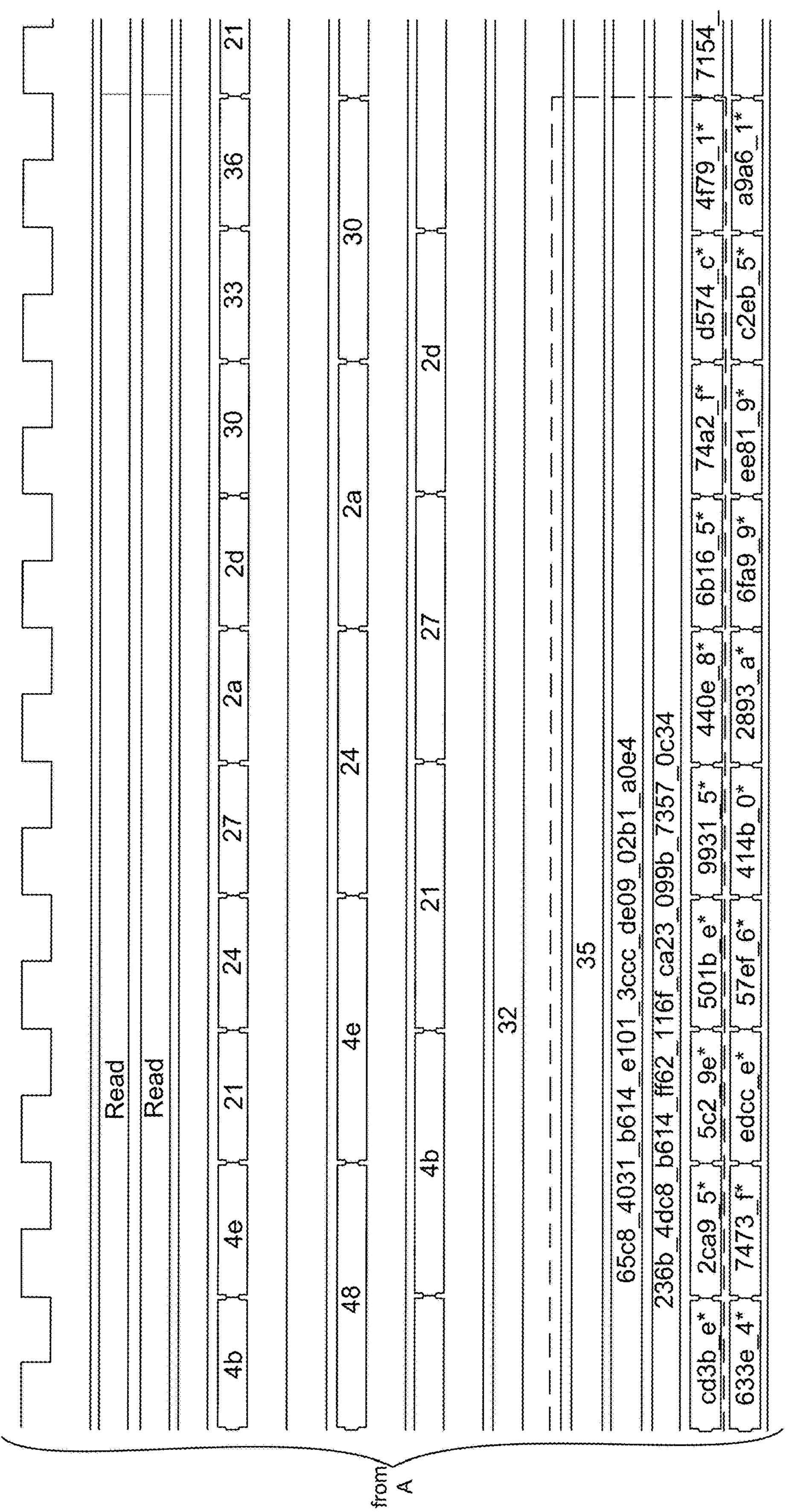

FIG. 9 illustrates an example write only (WO) mode simulation graph 900. In one example, data does not toggle while reading in WO mode, unlike the static cache memory buffer register architecture. In one example, the cache memory remains in WO mode while no read hit opportunities are present until a read miss occurs. For example, this behavior, the WO mode will be preserved and redundant data toggles are avoided to allow dc power savings.

Figure 10:
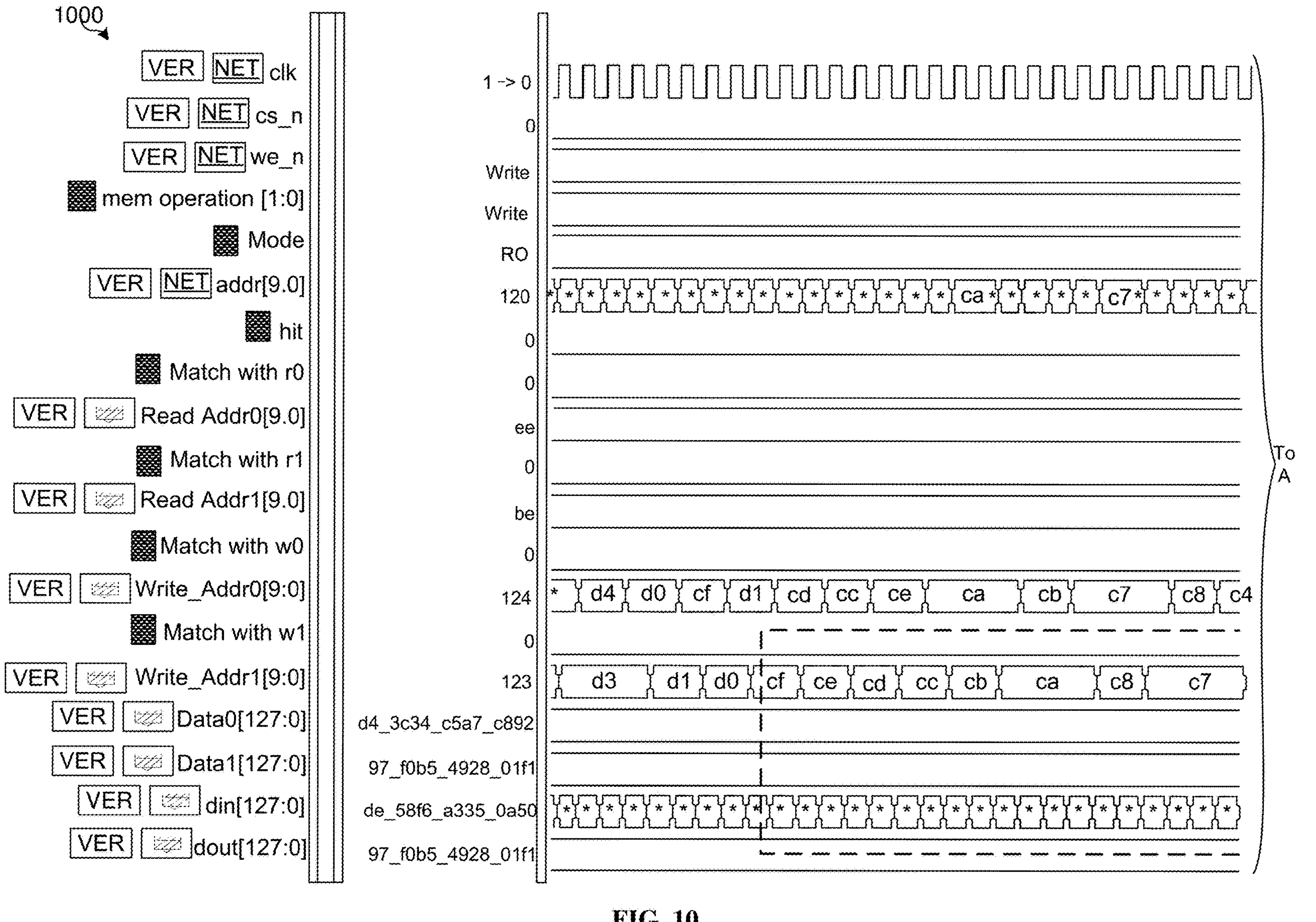
FIG. 10 illustrates an example read only (RO) mode simulation graph.
Figure 10:
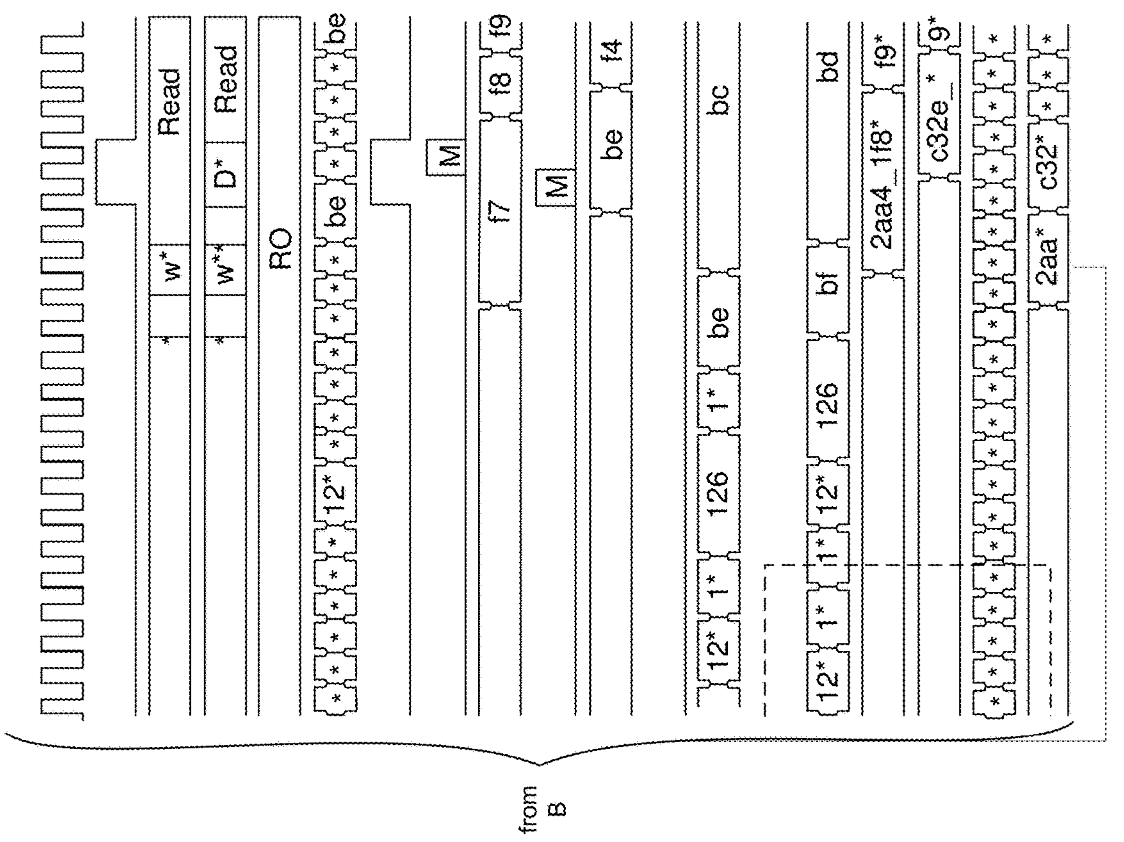

FIG. 10 illustrates an example read only (RO) mode simulation graph 1000. In one example, data does not toggle while writing in RO mode, unlike the static cache memory buffer register architecture. For example, the cache memory remains in RO mode while no write hit opportunities occur. In one example, the cache memory remains in RO mode while no write hit opportunities are present until a write miss occurs. For example, with this behavior, the RO mode will be preserved and redundant data toggles are avoided to allow dc power savings In one example, FIG. 9 and FIG. 10 show that cache memory mode switching is unnecessary until there are missing opportunities on the other side (i.e., write hit opportunities while in RO mode and read hit opportunities while in WO mode). In one example, removal of unnecessary mode switching enhances dc power saving as well.

Figure 11:
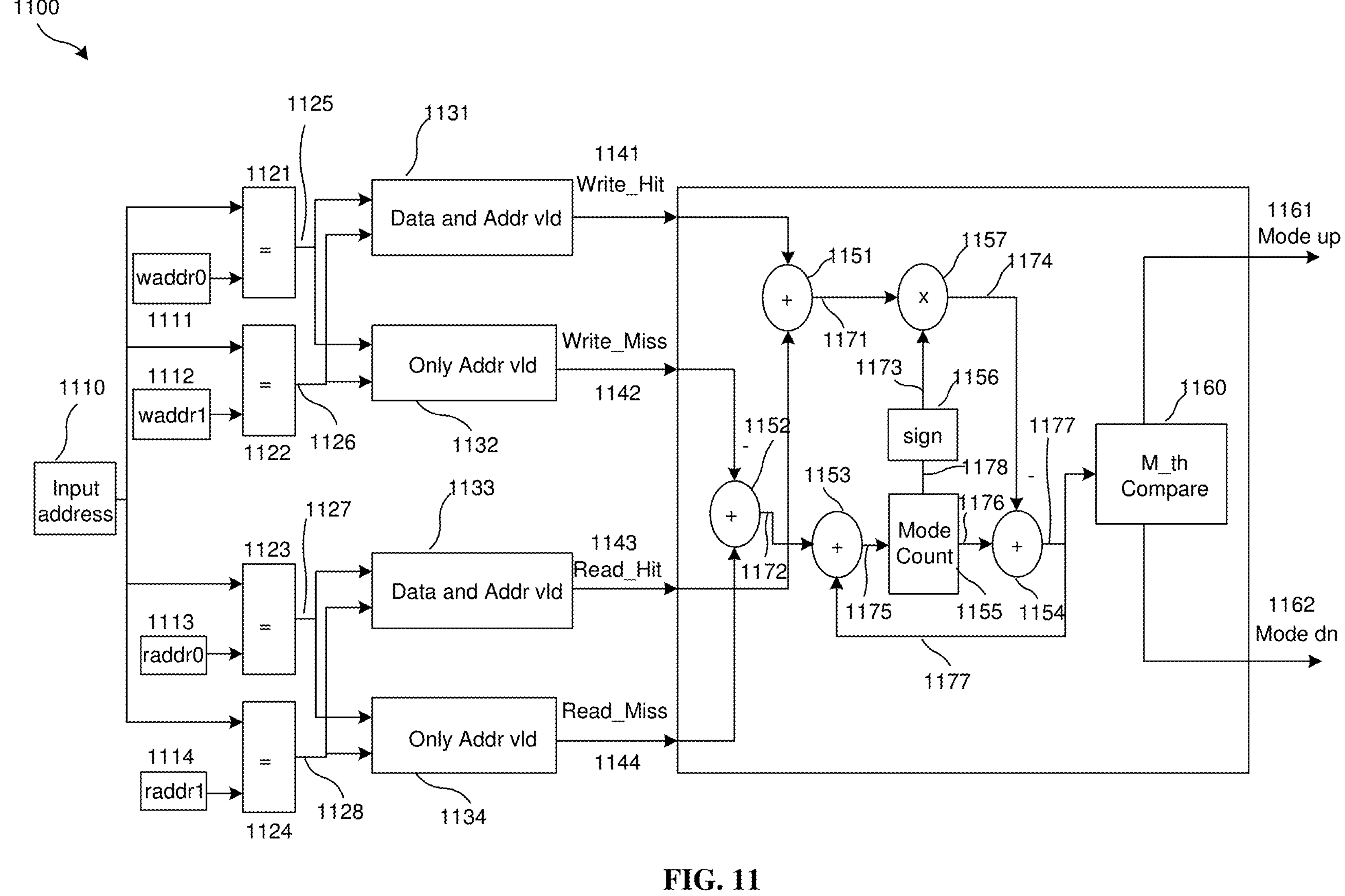
FIG. 11 illustrates an example hit-miss analysis block.

FIG. 11 illustrates an example hit-miss analysis block 1100. In one example, the hit-miss analysis block 1100 performs pattern identification in accessing a cache memory. In one example, an input address 1110 serves as an input to the hit-miss analysis block 1100. In one example, a first write address register (waddr0) 1111 holds a first write cache address and a second write address register (waddr1) 1112 holds a second write cache address. In one example, a first read address register (raddr0) 1113 holds a first read cache address and a second read address register (raddr1) holds a second read cache address. In one example, the input address 1110 is stored in an address register (not shown).

In one example, a first comparator 1121 compares the input address 1110 to the first write cache address to produce a first write address validation state 1125 with either a WRITE ADDRESS VALID state or a WRITE ADDRESS INVALID state. In one example, a second comparator 1122 compares the input address 1110 to the second write cache address to produce a second write address validation state 1126 with either the WRITE ADDRESS VALID state or the WRITE ADDRESS INVALID state. In one example, a third comparator 1123 compares the input address 1110 to the first read cache address to produce a first read address validation state 1127 with either a READ ADDRESS VALID state or a READ ADDRESS INVALID state. In one example, a fourth comparator 1124 compares the input address 1110 to the second read cache address to produce a second read address validation state 1128 with either the READ ADDRESS VALID state or the READ ADDRESS INVALID state.

In one example, the first write address validation state 1125 is sent to a write data and address validation block 1131 and to a write only address validation block 1132. In one example, the second write address validation state 1126 is also sent to the write data and address validation block 1131 and to the write only address validation block 1132 In one example, if either the first write address validation state 1125 or the second write address validation state 1126 is set to the WRITE ADDRESS VALID state, then the write data and address validation block 1131 increments a Write_Hit state 1141 if, in addition, valid data is available in cache memory. Otherwise, the Write_Hit state 1141 is not incremented. In addition, if either the first write address validation state 1125 or the second write address validation state 1126 is set to the WRITE ADDRESS INVALID state, then the write only address validation block 1132 increments a Write_Miss state 1142. Otherwise, the Write_Miss state 1142 is not incremented. In one example, the Write_Hit state 1141 accumulates a quantity of cache write hits and the Write_Miss state 1142 accumulates a quantity of cache write misses.

In one example, the first read address validation state 1127 is sent to a read data and address validation block 1133 and to a read only address validation block 1134. In one example, the second read address validation state 1128 is also sent to the read data and address validation block 1133 and to the read only address validation block 1134. In one example, if either the first read address validation state 1127 or the second read address validation state 1128 is set to the READ ADDRESS VALID state, then the read data and address validation block 1133 increments a Read_Hit state 1143 if, in addition, valid data is available in cache memory.

Otherwise, the Read_Hit state 1143 is not incremented. In addition, if either the first read address validation state 1127 or the second read address validation state 1128 is set to the READ ADDRESS INVALID state, then the read only address validation block 1134 increments a Read_Miss state 1144. Otherwise, the Read_Miss state 1144 is not incremented. In one example, the Read_Hit state 1143 accumulates a quantity of cache read hits and the Read_Miss state 1144 accumulates a quantity of cache read misses.

In one example, the Write_Hit state 1141 and the Read_Hit state 1143 are summed by a first summer 1151 to produce an aggregate hit count 1171. In one example, a negative of the Write_Miss state 1142 and the Read_Miss state 1144 are summed by a second summer 1152 to produce an aggregate miss count 1172. In one example, the aggregate hit count 1171 is used to maintain loop stability in the example hit-miss analysis block 1100. In one example, the negative of the Write_Miss state 1142 is used to assign more registers to the write side.

In one example, the aggregate miss count 1172 is summed by a third summer 1153 along with a net mode count 1177 to produce an adjusted miss count 1175. In one example, the adjusted miss count 1175 serves as an input to a mode count block 1155. For example, the mode count block 1155 is incremented or decremented according to the value of the adjusted miss count 1175. In one example, the mode count block 1155 provides a first mode count output 1176 which is a first input to a fourth summer 1154 and a second mode count output 1178 which is an input to a sign block 1156. In one example, the sign block 1156 provides a mode count polarity signal 1173 which is either +1 or −1 depending on the sign of the second mode count output 1178. In one example, the first mode count output 1176 is the same as the second mode count output 1178.

In one example, the aggregate hit count 1171 is a first input and the mode count polarity signal 1173 is a second input to a multiplier 1157. In one example, the multiplier 1157 provides a scaled aggregate hit count 1174 with a scaling dependent on the value (+1 or −1) of the mode count polarity signal 1173.

In one example, the fourth summer 1154 accepts the scaled aggregate hit count 1174 with a sign inversion as a second input. In one example, the net mode count 1177 is the output of the fourth summer 1154.

In one example, the net mode count 1177 is sent to a threshold comparison module 1160 for comparison with a mode threshold value M_th to update a plurality of mode toggle states. In one example, the plurality of mode toggle states includes a Mode_up state 1161 and a Mode_dn state 1162. In one example, if the net mode count 1177 exceeds the mode threshold value M_th, then the Mode_up state 1161 is asserted to a HIGH state. Otherwise, the Mode_up state 1161 is asserted to a LOW state. In one example, if the net mode count 1177 is less than the mode threshold value M_th, then the Mode_dn state 1162 is asserted to a HIGH state. Otherwise, the Mode_dn state 1162 is asserted to a LOW state.

In one example, the hit-miss analysis block 1100 uses the Mode_up state 1161 to assign a cache memory data buffer register to a write only (WO) mode assignment when asserted to a HIGH state. In one example, the hit-miss analysis block 1100 uses the Mode_dn state 1162 to assign a cache memory data buffer register to a read only (RO) mode assignment when asserted to a HIGH state. In one example, the cache memory data buffer register assignment is adaptive to the net mode count 1177. In one example, the net mode count 1177 depends on an accumulated quantity of cache write hits and accumulated quantity of cache read hits. In one example, the net mode count 1177 depends on an accumulated quantity of cache write misses and accumulated quantity of cache read misses.

Figure 12:
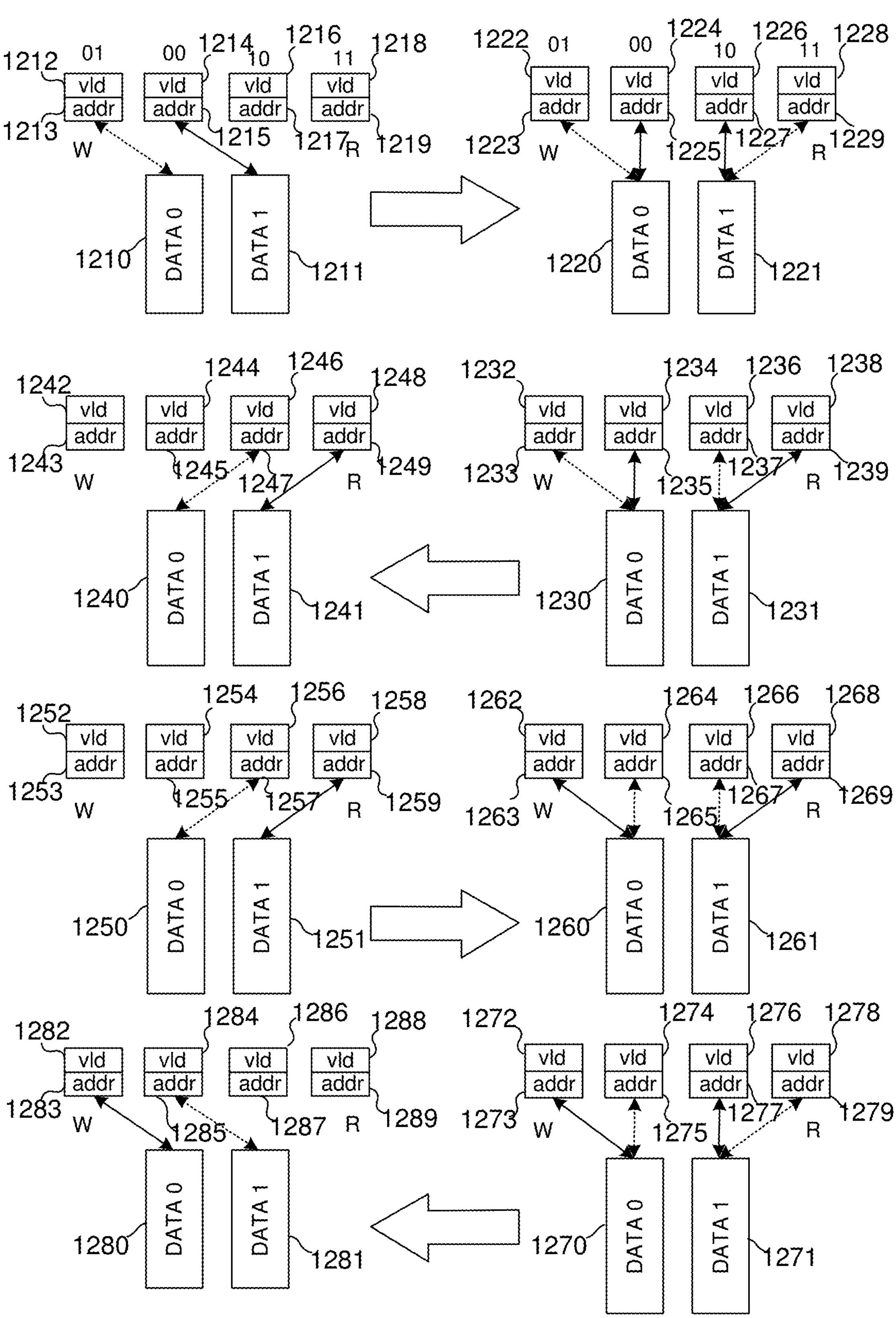
FIG. 12 illustrates an example adaptive mode assignment process diagram.

FIG. 12 illustrates an example adaptive mode assignment process diagram 1200. In one example, a mode reassignment may cause previously assigned data to be invalidated. In one example, the data invalidation occurs only once when a mode is switched based on a hit-miss analysis. For example, if an address validation state is VALID (i.e., asserted HIGH) for a valid address, and if a same address (as the valid address) is present in the cache memory, then all such addresses will be invalidated except the latest address.

In one example, for an adaptive cache memory buffer register architecture in a write only (WO) mode, a first data register 1210 is used for write memory access, and a second data register 1211 is used for write memory access. In one example, the first data register 1210 is coupled to a first write valid register 1212 and a first write address register 1213. In one example, the second data register 1211 is coupled to a second write valid register 1214 and a second write address register 1215. In one example, a first read valid register 1216 and a first read address register 1217 are decoupled from any data registers. In one example, a second read valid register 1218 and a second read address register 1219 are decoupled from any data registers.

In one example, after a mode switch to a read write (RW) mode, a first data register 1220 is used for write memory access, and a second data register 1221 is used for read memory access. In one example, the first data register 1220 is coupled to a first write valid register 1222, a first write address register 1223, a second write valid register 1224 and a second write address register 1225. In one example, the second data register 1221 is coupled to a first read valid register 1226, a first read address register 1227, a second read valid register 1228 and a second read address register 1229. In one example, the data in the second data register 1221 becomes invalidated after the mode switch.

In one example, in a read write (RW) mode, a first data register 1230 is used for write memory access, and a second data register 1231 is used for read memory access. In one example, the first data register 1230 is coupled to a first write valid register 1232, a first write address register 1233, a second write valid register 1234 and a second write address register 1235. In one example, the second data register 1231 is coupled to a first read valid register 1236, a first read address register 1237, a second read valid register 1238 and a second read address register 1239.

In one example, after a mode switch to a read only (RO) mode, a first data register 1240 is used for read memory access, and a second data register 1241 is used for read memory access. In one example, the first data register 1240 is coupled to a first read valid register 1246 and a first read address register 1247. In one example, the second data register 1241 is coupled to a second read valid register 1248 and a second read address register 1249. In one example, a first write valid register 1242 and a first write address register 1243 are decoupled from any data registers. In one example, a second write valid register 1244 and a second write address register 1245 are decoupled from any data registers. In one example, the data in the first data register 1240 becomes invalidated after the mode switch.

In one example, in a read write (RO) mode, a first data register 1250 is used for read memory access, and a second data register 1251 is used for read memory access. In one example, the first data register 1250 is coupled to a first read valid register 1256 and a first read address register 1257. In one example, the second data register 1251 is coupled to a second read valid register 1258 and a second read address register 1259. In one example, a first write valid register 1252 and a first write address register 1253 are decoupled from any data registers. In one example, a second write valid register 1254 and a second write address register 1255 are decoupled from any data registers.

In one example, after a mode switch to a read write (RW) mode, a first data register 1260 is used for write memory access, and a second data register 1261 is used for read memory access. In one example, the first data register 1260 is coupled to a first write valid register 1262, a first write address register 1263, a second write valid register 1264 and a second write address register 1265. In one example, the second data register 1261 is coupled to a first read valid register 1266, a first read address register 1267, a second read valid register 1268 and a second read address register 1269. In one example, the data in the first data register 1260 becomes invalidated after the mode switch.

In one example, in a read write (RW) mode, a first data register 1270 is used for write memory access, and a second data register 1271 is used for read memory access. In one example, the first data register 1270 is coupled to a first write valid register 1272, a first write address register 1273, a second write valid register 1274 and a second write address register 1275. In one example, the second data register 1271 is coupled to a first read valid register 1276, a first read address register 1277, a second read valid register 1278 and a second read address register 1279.

In one example, after a mode switch to a write only (WO) mode, a first data register 1280 is used for write memory access, and a second data register 1281 is used for write memory access. In one example, the first data register 1280 is coupled to a first write valid register 1282 and a first write address register 1283. In one example, the second data register 1281 is coupled to a second write valid register 1284 and a second write address register 1285. In one example, a first read valid register 1286 and a first read address register 1287 are decoupled from any data registers. In one example, a second read valid register 1288 and a second read address register 1289 are decoupled from any data registers. In one example, the data in the second data register 1281 becomes invalidated after the mode switch.

Figure 13:
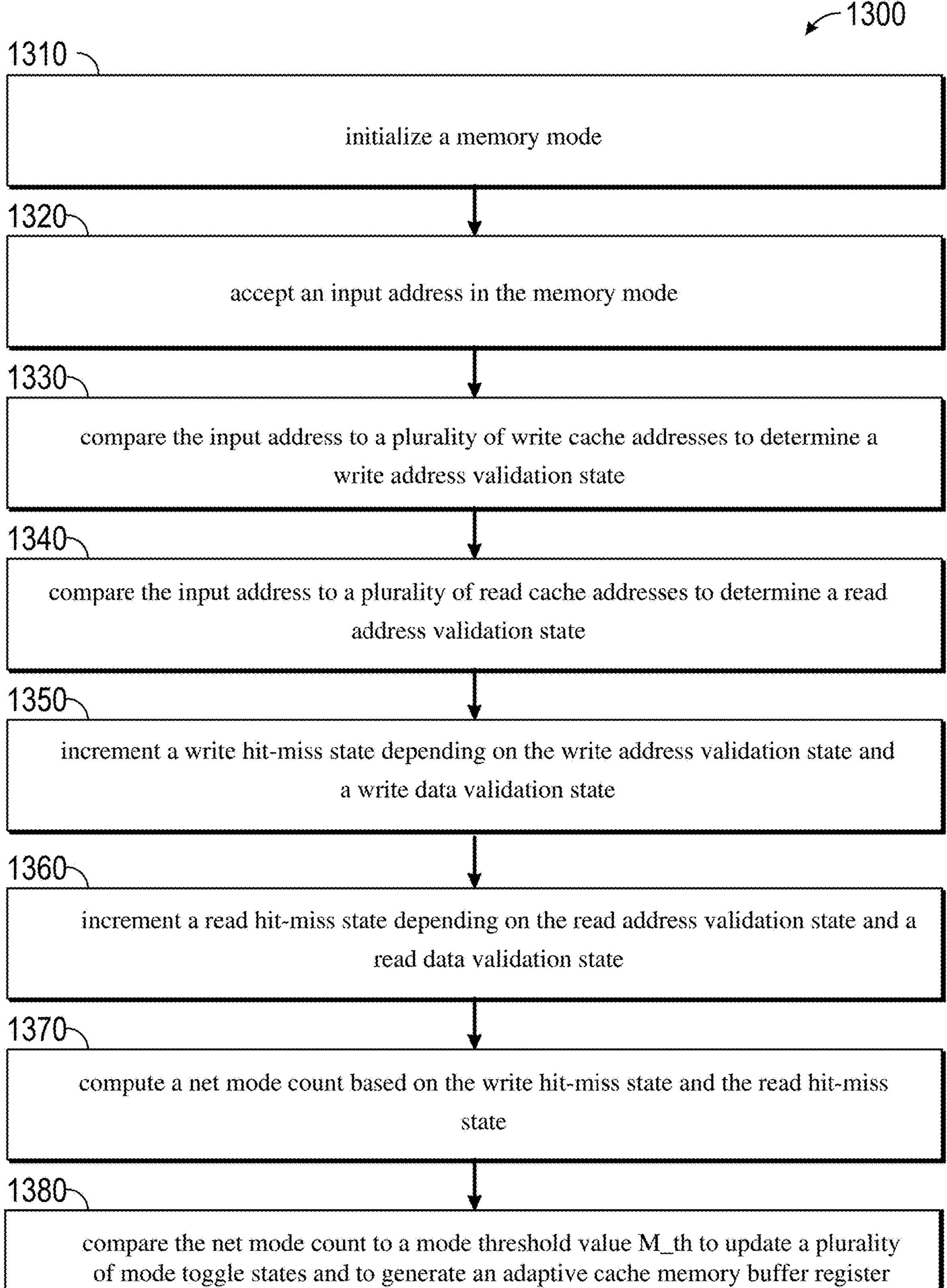
FIG. 13 illustrates an example flow diagram for implementing an adaptive cache memory buffer register reassignment.

FIG. 13 illustrates a flow diagram 1300 for implementing an adaptive cache memory buffer register reassignment. In block 1310, initialize a memory mode. In one example, a memory mode is initialized. In one example, the memory mode may be a write only (WO) mode, a read only (RO) mode, a read/write (RW) mode or a read write tunable (RWT) mode. In one example, the cache memory is part of an information processing system which includes a processing engine and a main memory. In one example, the initialization is performed by a memory controller or a processing engine. In one example, the adaptive cache memory buffer register assignment is performed on a cache memory.

In block 1320, accept an input address in the memory mode. In one example, an input address in the memory mode is accepted. In one example, the input address is a read cache address. In one example, the input address is a write cache address. In one example, the input address is accepted in the memory mode of a cache memory. In one example, the cache memory has a cache depth (i.e., a maximum number of cache lines). In one example, a cache memory hit-miss analysis module (e.g., hit-miss analysis block 1100 of FIG. 11) performs pattern identification in accessing a cache memory. In one example, the cache memory hit-miss analysis module is part of the memory controller or the processing engine. In one example, the input address is accepted from a memory controller or a processing engine. In one example, the step of block 1320 is performed by a cache memory hit-miss analysis module. In one example, the cache memory hit-miss analysis module is coupled to a cache memory. In one example, the input address resides in the cache memory. In one example, the step of block 1320 is performed by a processing engine.

In block 1330, compare the input address to a plurality of write cache addresses to determine a write address validation state. In one example, the input address is compared to a plurality of write cache addresses to determine a write address validation state. In one example, the write address validation state is a WRITE ADDRESS VALID state if the input address matches at least one of the plurality of write cache addresses. In one example, the write address validation is a WRITE ADDRESS INVALID state if the input address does not match any of the plurality of write cache addresses. In one example, the plurality of write cache addresses are stored in a plurality of write address registers. In one example, the comparison is performed by the cache memory hit-miss analysis module. In one example, the step of block 1330 is performed by a processing engine.

In block 1340, compare the input address to a plurality of read cache addresses to determine a read address validation state. In one example, the input address is compared to a plurality of read cache addresses to determine a read address validation state. In one example, the read address validation state is a READ ADDRESS VALID state if the input address matches at least one of the plurality of read cache addresses. In one example, the read address validation is a READ ADDRESS INVALID state if the input address does not match any of the plurality of read cache addresses. In one example, the plurality of read cache addresses are stored in a plurality of address registers. In one example, the comparison is performed by the cache memory hit-miss analysis module. In one example, the step of block 1340 is performed by a processing engine.

In block 1350, increment a write hit-miss state depending on the write address validation state and a write data validation state. In one example, a write hit-miss state is incremented depending on the write address validation state and a write data validation state. In one example, the write hit-miss state is incremented for a write hit state (e.g., Write_Hit state 1141 of FIG. 11) if the write address validation state is the WRITE ADDRESS VALID state and the write data validation state indicates valid data is available in cache memory. In one example, the write hit-miss state is incremented for a write miss state (e.g., Write_Miss state 1142 of FIG. 11) if the write address validation state is the WRITE ADDRESS INVALID state. In one example, the write miss state (e.g., Write_Miss state 1142 of FIG. 11) is different from the write hit-miss state. In one example, the incrementing is performed by the cache memory hit-miss analysis module. In one example, the step of block 1350 is performed by a processing engine.

In block 1360, increment a read hit-miss state depending on the read address validation state and a read data validation state. In one example, a read hit-miss state is incremented depending on the read address validation state and a read data validation state. In one example, the read hit-miss state is incremented for a read hit state (e.g., Read_Hit state 1143 of FIG. 11) if the read address validation state is the READ ADDRESS VALID state and the read data validation state indicates valid data is available in cache memory. In one example, the read hit-miss state is incremented for a read miss state (e.g., Read_Miss state 1144 of FIG. 11) if the read address validation state is the READ ADDRESS INVALID state. In one example, the read miss state (e.g., Read_Miss state 1144 of FIG. 11) is different from the read hit-miss state. In one example, the incrementing is performed by the cache memory hit-miss analysis module. In one example, the step of block 1360 is performed by a processing engine.

In block 1370, compute a net mode count based on the write hit-miss state and the read hit-miss state. In one example, a net mode count is computed based on the write hit-miss state and the read hit-miss state. In one example, once the net mode count is computed, the net mode count is further adjusted based on a comparison of the read miss state (e.g., Read_Miss state 1144 of FIG. 11) and the write miss state (e.g., Write_Miss state 1142 of FIG. 11). In one example, the write miss state (e.g., Write_Miss state 1142 of FIG. 11) is different from the write hit-miss state. In one example, the read miss state (e.g., Read_Miss state 1144 of FIG. 11) is different from the read hit-miss state. In one example, the comparison is a difference between the read miss state (e.g., Read_Miss state 1144 of FIG. 11) and the write miss state (e.g., Write_Miss state 1142 of FIG. 11). In one example, the net mode count is steered towards a null (i.e., zero) value by a scaled aggregate hit count. In one example, the scaled aggregate hit count is based on a superposition of the write hit state (e.g., Write_Hit state 1141 of FIG. 11) and the read hit state (e.g., Read_Hit state 1143 of FIG. 11). In one example, the computing is performed by the cache memory hit-miss analysis module. In one example, the step of block 1370 is performed by a processing engine.

In block 1380, compare the net mode count to a mode threshold value M_th to update a plurality of mode toggle states and to generate an adaptive cache memory buffer register reassignment based on the plurality of mode toggle states. In one example, the net mode count is compared to a mode threshold value M_th to update a plurality of mode toggle states and to generate an adaptive cache memory buffer register reassignment based on the plurality of mode toggle states.

In one example, the plurality of mode toggle states includes a Mode_up state and a Mode_dn state. In one example, if the net mode count exceeds the mode threshold value M_th, then the Mode_up state is asserted to a HIGH state for a write only (WO) mode reassignment. Otherwise, the Mode_up state is asserted to a LOW state. In one example, if the net mode count is less than the mode threshold value M_th, then the Mode_dn state is asserted to a HIGH state for a read only (RO) mode reassignment. Otherwise, the Mode_dn state is asserted to a LOW state. In one example, the computing is performed by the cache memory hit-miss analysis module. In one example, the step of block 1380 is performed by a processing engine.

In one aspect, one or more of the steps for providing adaptive cache memory buffer register reassignment in FIG. 13 may be executed by one or more processors which may include hardware, software, firmware, etc. The one or more processors, for example, may be used to execute software or firmware needed to perform the steps in the flow diagram of FIG. 13. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

One skilled in the art would understand that various features of different embodiments may be combined or modified and still be within the spirit and scope of the present disclosure.

What is claimed is:

1. An apparatus comprising:

a first summer coupled to a second summer, the first summer and the second summer configured to increment a write hit-miss state based on a write address validation state and a write data validation state, and further configured to increment a read hit-miss state based on a read address validation state and a read data validation state;

a mode count block coupled to the first summer and the second summer, the mode count block configured to compute a net mode count based on the write hit-miss state and the read hit-miss state; and a threshold comparison module coupled to the mode count block, the threshold comparison module configured to compare the net mode count to a mode threshold value to update a plurality of mode toggle states.

2. The apparatus of claim 1, wherein the threshold comparison module is further configured to generate an adaptive cache memory buffer register reassignment based on the plurality of mode toggle states and an input address.

3. The apparatus of claim 2, further comprising a write data and address validation block coupled to the first summer, the write data and address validation block configured to store the write address validation state.

4. The apparatus of claim 3, further comprising a write only address validation block coupled to the second summer, the write only address validation block configured to store the write data validation state.

5. The apparatus of claim 4, further comprising a read data and address validation block coupled to the first summer, the read data and address validation block configured to store the read address validation state.

6. The apparatus of claim 5, further comprising a read only address validation block coupled to the second summer, the read only address validation block configured to store the read data validation state.

7. The apparatus of claim 6, further comprising a plurality of comparators coupled to an address register configured to store the input address, the plurality of comparators each configured to compare the input address to either a write address register or a read address register.

8. An apparatus comprising:

means for incrementing a write hit-miss state based on a write address validation state and a write data validation state;

means for incrementing a read hit-miss state based on a read address validation state and a read data validation state;

means for computing a net mode count based on the write hit-miss state and the read hit-miss state;

means for comparing the net mode count to a mode threshold value to update a plurality of mode toggle states; and means for generating an adaptive cache memory buffer register reassignment based on the plurality of mode toggle states.

9. The apparatus of claim 8, further comprising:

means for comparing an input address to a plurality of write cache addresses to determine the write address validation state; and means for comparing the input address to a plurality of read cache addresses to determine the read address validation state.

10. The apparatus of claim 9, further comprising means for accepting the input address in a memory mode.

11. A method comprising:

incrementing a write hit-miss state based on a write address validation state and a write data validation state;

incrementing a read hit-miss state based on a read address validation state and a read data validation state;

computing a net mode count based on the write hit-miss state and the read hit-miss state;

comparing the net mode count to a mode threshold value to update a plurality of mode toggle states; and generating an adaptive cache memory buffer register reassignment based on the plurality of mode toggle states.

12. The method of claim 11, further comprising adjusting the net mode count based on a comparison of a read miss state and a write miss state once the net mode count is computed.

13. The method of claim 12, wherein the comparison is a difference between the read miss state and the write miss state.

14. The method of claim 11, further comprising steering the net mode count towards a null value.

15. The method of claim 14 wherein the steering is based on a scaled aggregate hit count.

16. The method of claim 15, wherein the scaled aggregate hit count is based on a superposition of a write hit state and a read hit state.

17. The method of claim 11, further comprising comparing an input address to a plurality of write cache addresses to determine the write address validation state.

18. The method of claim 17, further comprising comparing the input address to a plurality of read cache addresses to determine the read address validation state.

19. The method of claim 18, further comprising accepting the input address in a memory mode.

20. The method of claim 19, further comprising initializing the memory mode.

* * * * *